US011227059B2

(12) United States Patent
Blandin et al.

(10) Patent No.: US 11,227,059 B2
(45) Date of Patent: Jan. 18, 2022

(54) REGULATORY COMPLIANCE FOR APPLICATIONS APPLICABLE TO PROVIDING A SERVICE FOR REGULATORY COMPLIANCE ON A CLOUD

(71) Applicant: International Business Machines Corporation, Armonk, NY (US)

(72) Inventors: Sebastien Blandin, Singapore (SG); Chaitanya Kumar, Singapore (SG); Karthik Nandakumar, Singapore (SG)

(73) Assignee: International Business Machines Corporation, Armonk, NY (US)

( * ) Notice: Subject to any disclaimer, the term of this patent is extended or adjusted under 35 U.S.C. 154(b) by 187 days.

(21) Appl. No.: 16/568,941

(22) Filed: Sep. 12, 2019

(65) Prior Publication Data

US 2021/0081561 A1 Mar. 18, 2021

(51) Int. Cl.
G06F 21/00 (2013.01)
G06F 21/62 (2013.01)
G06F 21/60 (2013.01)
G06Q 50/26 (2012.01)

(52) U.S. Cl.
CPC ........ *G06F 21/6227* (2013.01); *G06F 21/602* (2013.01); *G06F 21/6245* (2013.01); *G06F 21/6272* (2013.01); *G06Q 50/26* (2013.01)

(58) Field of Classification Search
None
See application file for complete search history.

(56) References Cited

U.S. PATENT DOCUMENTS

| 6,256,640 | B1* | 7/2001 | Smalley | G06Q 10/06395 705/28 |
| 7,685,194 | B2* | 3/2010 | Kabra | G06F 21/6227 707/719 |
| 8,311,863 | B1* | 11/2012 | Kemp | G06Q 10/0639 705/7.11 |
| 2004/0139053 | A1 | 7/2004 | Haunschild | |

(Continued)

OTHER PUBLICATIONS

MicroFocus "Meeting Data Residency and Compliance Challenges in Global Enterprises" Innovative Security Solutions Enhance Business Agility and Reduce Risk [downloaded Aug. 10, 2019].

*Primary Examiner* — Maung T Lwin
(74) *Attorney, Agent, or Firm* — Harrington & Smith

(57) ABSTRACT

A computer system accesses and processes regulatory requirements for data item(s) in a private manner. Both the data item(s) and the regulatory requirements are accessed and processed privately. The computer system creates an orchestration strategy satisfying the regulatory requirements. The orchestration strategy includes recommendation(s) associating the data item(s) with process(es). The computer system outputs indications of the orchestration strategy to be used to implement regulatory compliance for processing of the data item(s) by associated ones of the process(es). The computer system may be implemented as a portion of a cloud environment, and compliance may be offered as a service for cases where data usage by an application (implementing the process(es)) does not address compliance with the regulatory requirements, but following the orchestration strategy ensures use of the application on the data item(s) will comply with the regulatory requirements.

20 Claims, 6 Drawing Sheets

(56) References Cited

U.S. PATENT DOCUMENTS

| | | |
|---|---|---|
| 2008/0163347 A1* | 7/2008 | Ratcliff ................ G06F 21/604 |
| | | 726/6 |
| 2015/0379303 A1* | 12/2015 | LaFever .............. G06F 21/6254 |
| | | 726/28 |
| 2017/0097841 A1 | 4/2017 | Chang et al. |
| 2018/0103084 A1 | 4/2018 | Auvenshine et al. |
| 2018/0196958 A1 | 7/2018 | Chari et al. |
| 2018/0285887 A1 | 10/2018 | Maung |
| 2018/0307859 A1 | 10/2018 | LaFever et al. |
| 2019/0058640 A1 | 2/2019 | Bildhauer et al. |
| 2019/0166153 A1* | 5/2019 | Steele ................ H04L 63/1441 |

* cited by examiner

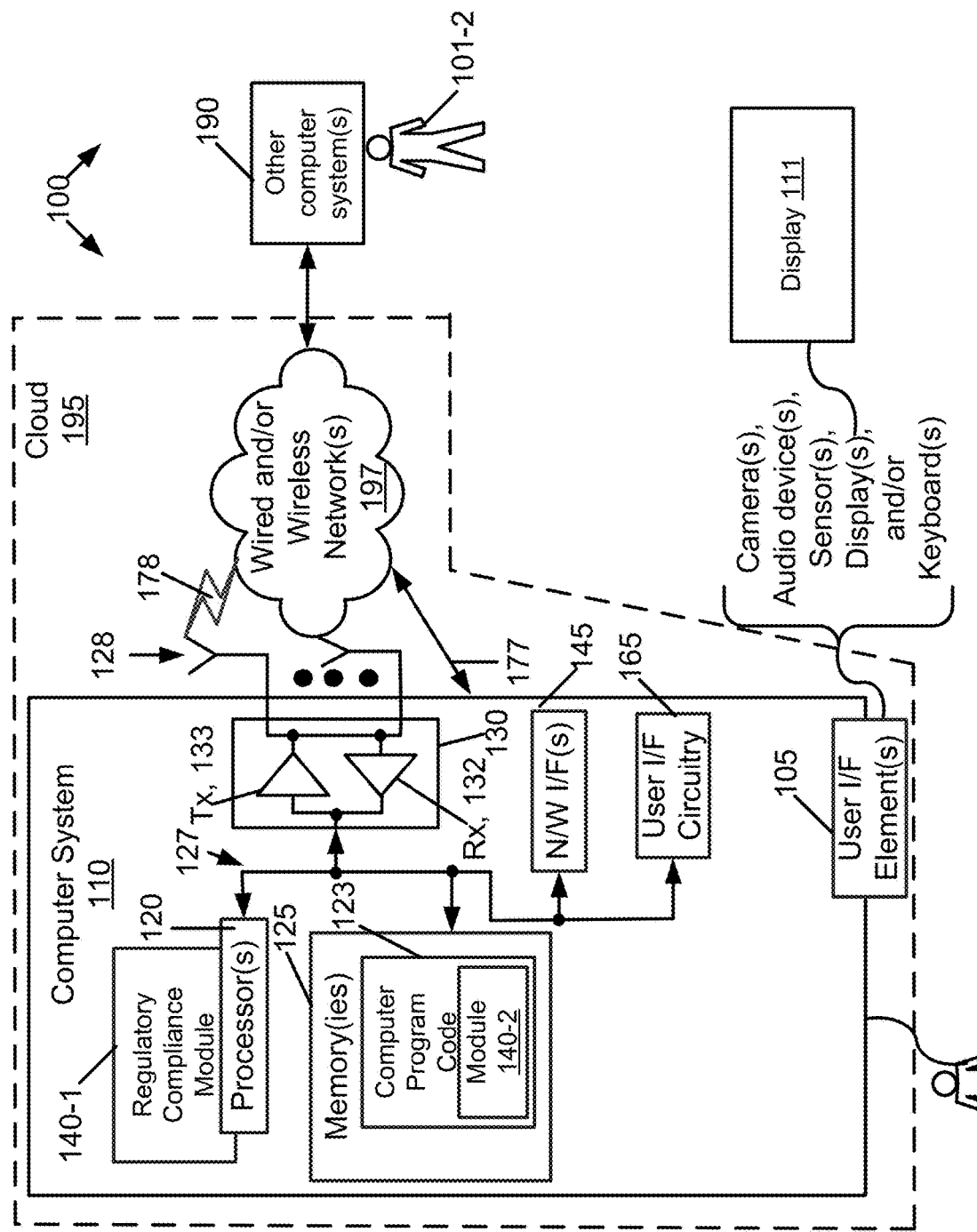

REGULATORY COMPLIANCE FOR APPLICATIONS APPLICABLE TO PROVIDING A SERVICE FOR REGULATORY COMPLIANCE ON A CLOUD

BACKGROUND

This invention relates generally to privacy and, more specifically, relates to improving regulatory compliance of applications.

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section. Abbreviations that may be found in the specification and/or the drawing figures are defined below, at the beginning of the detailed description section.

The European Union (EU) General Data Protection Regulation (GDPR) is effective as of 25 May 2018 and imposes heavy fines—up to 4% of annual revenue—on organizations for noncompliance. Many companies operate in regulated industries and handle sensitive data, adding significant costs to operations.

The finance industry spends $270 billion on compliance-related costs, and the healthcare industry spends about $39 billion annually on the administrative facets of regulatory compliance.

Similarly, technology providers that handle sensitive data across industry are also challenged and exposed to reputation risk and fines. IBM Cloud, for example, must comply with GDPR; Health Insurance Portability and Accountability Act (HIPAA), which is United States legislation that provides data privacy and security provisions for safeguarding medical information; FedRAMP, which is a federal program that simplifies security for the digital age by providing a standardized approach to security for the cloud; IRAP, which is is an Australian Signals Directorate (ASD) initiative to provide high-quality information and communications technology (ICT) security assessment services to government; PCI DSS, which is a set of security standards designed to ensure that all companies that accept, process, store or transmit credit card information maintain a secure environment.

One additional set of regulations in the United States is International Traffic in Arms Regulations (ITAR), which prohibits companies and individuals from importing or exporting defence-related information and materials. However, many companies have networks where data travels freely, and many companies are international, meaning data could be shared between the company in the United States and its affiliates in other countries. For additional considerations, see the white paper by MicroFocus, "Meeting Data Residency and Compliance Challenges in Global Enterprises: Innovative Security Solutions Enhance Business Agility and Reduce Risk" (2018). Microfocus is a company that helps run and transform businesses.

Compliance is currently a labour-intensive process in many industries. As new regulations appear, many companies still trend towards huge manual efforts to remediate issues rather than experimenting with innovative solutions.

SUMMARY

This section is meant to be exemplary and not meant to be limiting.

An exemplary embodiment is a method including accessing and processing, by a computer system, regulatory requirements for one or more data items in a private manner Both the one or more data items and the regulatory requirements are accessed and processed privately. The method includes creating by the computer system an orchestration strategy satisfying the regulatory requirements. The orchestration strategy comprises one or more recommendations associating the one or more data items with one or more processes. The method also includes outputting by the computer system indications of the orchestration strategy to be used to implement regulatory compliance for processing of the one or more data items by associated one or more processes.

Another example is a computer system comprising one or more memories having computer-readable code thereon and one or more processors. The one or more processors, in response to retrieval and execution of the computer-readable code, cause the computer system to perform operations comprising: accessing and processing, by a computer system, regulatory requirements for one or more data items in a private manner, wherein both the one or more data items and the regulatory requirements are accessed and processed privately; creating by the computer system an orchestration strategy satisfying the regulatory requirements, wherein the orchestration strategy comprises one or more recommendations associating the one or more data items with one or more processes; and outputting by the computer system indications of the orchestration strategy to be used to implement regulatory compliance for processing of the one or more data items by associated one or more processes.

A further example is a computer program product comprising a computer readable storage medium having program instructions embodied therewith. The program instructions executable by a computer system to cause the computer system to perform operations comprising: accessing and processing, by a computer system, regulatory requirements for one or more data items in a private manner, wherein both the one or more data items and the regulatory requirements are accessed and processed privately; creating by the computer system an orchestration strategy satisfying the regulatory requirements, wherein the orchestration strategy comprises one or more recommendations associating the one or more data items with one or more processes; and outputting by the computer system indications of the orchestration strategy to be used to implement regulatory compliance for processing of the one or more data items by associated one or more processes.

BRIEF DESCRIPTION OF THE SEVERAL VIEWS OF THE DRAWINGS

FIG. 1B is a block diagram of one possible and non-limiting exemplary system in which the exemplary embodiments may be practiced;

FIG. 2, spread over

DETAILED DESCRIPTION

Figure 1A:
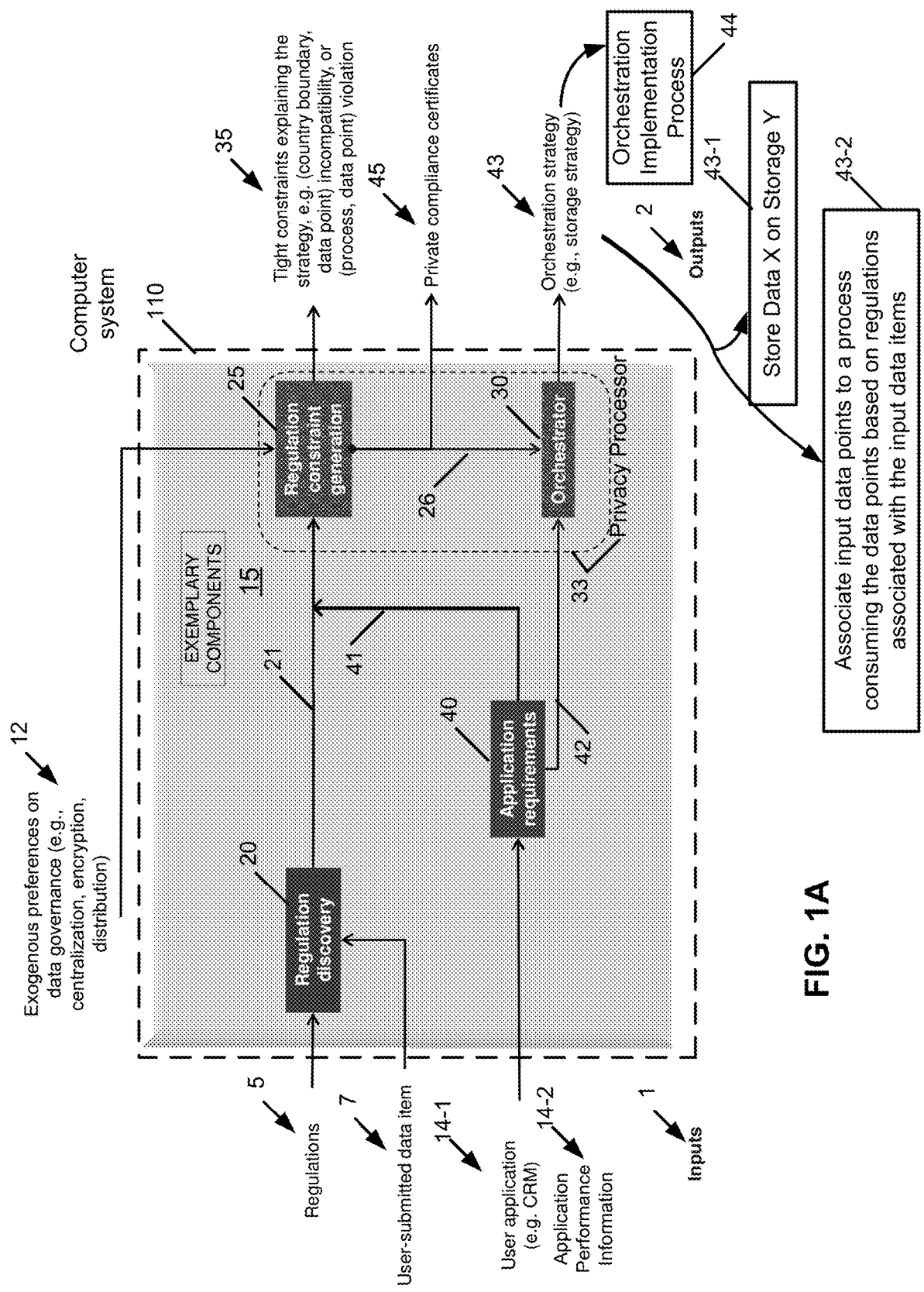
FIG. 1A is a block diagram of exemplary components, as implemented by a computer system, and their inputs and outputs for an exemplary embodiment.

The following abbreviations that may be found in the specification and/or the drawing figures are defined as follows:

ACL Access Control List
CRM Customer Relationship Management
EU European Union
GDPR General Data Protection Regulation
I/F interface
IRAP Information Security Registered Assessors Program
PCI Payment Card Industry Data Security Standard
PDPA Personal Data Protection Act
PII Personally Identifiable Information
PSI Private Set Intersection
Rx receiver
SPI Sensitive Personal Information
Tx transmitter The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

As described above, compliance with regulations is a challenge and is currently a labour-intensive process in many industries. As new regulations appear, many companies still trend towards huge manual efforts to remediate issues rather than experimenting with innovative solutions.

This disclosure provides innovative solutions to these issues. For instance, exemplary embodiments herein aim at reducing friction associated with hybrid cloud onboarding and virtualizing and automating private compliance, e.g., by offering a native cloud service for private verification and certification of compliance to regulations at a data record level.

To achieve these solutions, an exemplary embodiment ingests data records and data record level regulatory requirements in a private manner, i.e., without explicitly reading the data and regulation in plaintext. An exemplary embodiment deploys a virtualization strategy with native compliance to regulations, including one or more of the following: residency laws and requirements to keep data within national or organizational boundaries; and/or usage traceability and requirements to use data only for specific applications and processes.

An exemplary embodiment produces compliant dynamic virtualization, i.e. in the case of storage virtualization (Box), orchestrates the sandboxing, redundancy, and access control lists (ACLs) in accordance with regulations. Box is a company that provides secure platforms for content workflow and management. Exemplary embodiments may also produce certificates of compliance to regulations in zero-knowledge form, i.e., without revealing the orchestration strategy, which allows an administrator or regulator to exhaustively, digitally, and privately verify compliance.

Exemplary embodiments may optionally suggest and recommend regulations that might apply to a data item based on the data properties, e.g., for data records with keys as NAME, SURNAME. Alternatively or additionally, exemplary embodiments may ask the authenticated user to confirm that the data item is not subject to GDPR or Personal Data Protection Act (PDPA).

As additional overview, an exemplary idea is to implement a cloud service, which is natively compliant to regulations, for standard applications (which are not natively compliant to regulations). Consider the following example. The canonical application is virtual storage, such as Box or DropBox. Box is a cloud content management and file sharing service for businesses. DropBox is a file hosting service that offers cloud storage, file synchronization, personal cloud, and client software. Currently from a machine such as a personal computer, one can drop a confidential file subject to residency in a Box or DropBox folder and that file gets replicated, typically in multiple data centers, the replication process being agnostic to the residency law. That is, the application is not natively compliant with regulations. It is noted that an application is also called a service herein, as Box and DropBox and the like are typically provided as services to a user. A simple example of an application herein is storage as just described, which lends itself nicely to an example with a residency requirement, while a complex example is generic data processing (i.e. each data item being ingested by a process), which lends itself nicely to GDPR (where certain processes are allowed but not others). So, an exemplary embodiment herein proposes to also account for the regulation when implementing the application.

Furthermore, a key challenge is that through the very action of accessing a file or other data item in a standard manner, the service may violate the regulation. Consider examples where i) a general service may violate the regulation by accessing the data in a standard manner, hence for compliance, must not; and ii) a compliance-checking service may also violate the regulation by accessing the data in a standard manner.

For instance, if a data item has to remain within a set of countries within which the cloud provider has no data center, this could cause a violation of a regulation. That is, if a regulation stipulates that data should not leave the country, the cloud service cannot a-priori access the file (since the cloud service is not aware of the constraint before accessing the file).

Consider also another example of a cloud service that verifies that data is anonymized. For anonymization, the data has to be sent in plain text, is anonymized, and returned as anonymized. If executed in the absence of the techniques herein, when the cloud service of this example finds a non-anonymized (plain text) file, which is the actual objective of this example, the cloud service violates the regulation that the cloud service is seeking to verify. On the other hand, if as explained subsequently, the verification is executed in the encrypted/obfuscated/garbled/secret (i.e., different ways of hiding processed information) domain, no regulation is violated.

The cloud context is particularly difficult for regulatory compliance. That is, automated compliance that is executed by a cloud service creates all sorts of paradoxes (e.g., the act of verifying compliance violates compliance), as described above. This because the cloud service is in effect a third-party, subject to compliance, while an on-premise software to check compliance is not subject to compliance. For instance, the case of data having to be anonymized is not a problem if the data remains on the premise, since the personally identifying information is not passed to a third-party. By contrast, this is a problem (as described above) in the cloud context.

Exemplary embodiments herein may address this by executing the objective (e.g., data storage or generic data processing) privately, without revealing any information about the data or the associated regulation. The private execution with respect to the associated regulation is because knowing the regulation associated with a data item tells one something about the data item, i.e. leaks information. Concretely, in an exemplary instance herein, a cloud service would require encryption of PII and SPI, anonymize them in the encrypted domain, and return the encrypted anonymized data, which the user would then decrypt to obtain the result.

An optional input is a set of certain user preferences that are not needed to meet the application requirements or comply with the regulation. Optional outputs are human-understandable versions of the constraints being generated, and also certificates which allow one to verify that a chosen strategy complies with the regulation(s), without revealing the strategy itself or information about the data.

Before proceeding with additional details, some additional examples are provided. One example relates to residency law compliance for virtual storage. For this example, a system privately collects information (e.g., data item, allowed country storage) on individual data items upon submission to the system. The system assembles other information (e.g., virtual storage unit, country location) from the available resource pool. For each (data item, virtual storage unit) pair, the system runs assessments of whether storing the data item in the unit is allowed. These assessments may be performed via, e.g., Private Set Intersection (PSI) in case the allowed country storage is private. The system then privately optimizes the assignment of data items to virtual storage unit (or units) using a private linear program.

In additional detail for this example, an objective is to assign each data item to a location. Some assignments, however, are not feasible (e.g., because of residency law in the location). And even determining if the assignment is feasible may not be known (e.g., if the data has to remain local, a cloud service cannot a-priori access the data to become aware of that restriction). So the assignment is done privately, i.e., without actually compromising the compliance to the residency regulation, using, e.g., PSI.

Another example is GDPR compliance for Customer Relationship Management (CRM). In this example, the system privately collects process identifiers (pids) and allowed accesses (pid, access) and input data items regulations (data item, regulation). The latter includes both the input data and the regulation. This is an overloaded setup, but is meant to indicate that each point is knowingly associated with a regulation with which the data item must comply. The system in this exemplary embodiment refers to a public mapping from access to regulation to assess which process class is allowed to access data items subject to each specific regulation. The system runs a private join to associate the regulations of input data items to the process consuming them. The system automatically certifies compliance or reports deviations, e.g., by reporting that a data item from a European citizen is used for reasons not present in the Terms of Service, and hence does not comply with GDPR. That is, equating compliance with GDPR, this allows using the data only for reasons explicitly present in the Terms of Service and hence agreed upon by the user.

Now that an overview and some example implementations have been described, additional detail is described. Turning to FIG. 1A, this figure is a block diagram of exemplary components, as implemented by a computer system, and their inputs and outputs for an exemplary embodiment. In FIG. 1, a number of exemplary components 15 are shown that are implemented by a computer system 110 and may be used to implement an exemplary embodiment. The exemplary components 15 include a regulation discovery component 20, an application requirements component 40, and a privacy processor 33 that comprises a regulation constraint generation component 25 and an orchestrator component 30. The inputs 1 comprise exogenous preferences 12 on data governance (such as centralization, encryption, distribution), regulations 5, a user-submitted data item, and a user application 14 (such as CRM). The outputs 2 comprise tight constraints 35 explaining the strategy, e.g. (country boundary, data item) incompatibility, or (process, data item) violation, private compliance certificates 45, and virtualization strategy (e.g., storage strategy).

The tight constraints 35 are human-understandable sets attempting to summarize the set of constraints. For instance, the constraints 35 could indicate that a data item cannot be associated by a certain country/process, so that the user understands better what is happening. The incompatibility or (process, data item) violations are additional possibilities, characterizing that the data item should not be associated with a location or process.

Generating these constraints 35 is the job of regulation constraint generation component 25, but the constraints emanate in their raw form from the regulations, e.g. residency regulations are equivalent to point/country incompatibility, and GDPR implies that the data item can only be used for certain activities, which should be mappable to a set of processes. That is, GDPR seemingly requires that data is used only for the purposes that the user explicitly validated in a set of Terms and Conditions.

The private compliance certificates 45 are certificates indicating that following the set of constraints, a given data item satisfies the regulation. It is private, i.e. the certificate does not disclose what the constraints are, or anything about the strategy, but disclose instead that the data item and its use by the application 14-1 complies with the constraints as long as the orchestration strategy 43 is followed. As is known, it is possible to certify properties without revealing more, such as through zero-knowledge proofs.

The preferences 12 are taken as additional constraints, if these are used. For instance, if a user says "data X cannot be stored in country Y" for no clear reason (and in particular this not being explained by a regulation), the regulation constraint generation component 25 still adds that to the list of constraints 25 (e.g., and possibly also constraints 35). Similar requirements might be placed on centralization (e.g., where data can be stored), encryption (e.g., the type of encryption used), and/or the distribution (e.g., the data should be distributed in multiple locations instead of a single location).

The regulation discovery component 20 is optional in an exemplary embodiment. In an absence of regulation for a given data entry, this component 20 either creates a worst-case regulation type, or infers a most likely associated regulation given other known data records-regulation pairs. As described above, each data item input to the algorithm should be explicitly associated with the regulations the data item has to follow. In many situations, this is obviously not case. For instance, if one uses a service like Box or Drop-Box, considering any file that is put there, the file clearly does not come with a collection of regulations the file has to follow. So an exemplary embodiment proposes to "learn" the regulation(s) the data item (e.g., the file) has to follow, based on a history of (data item, regulation) pairs. For instance, previously submitted user-submitted data items 7 may have been submitted with corresponding regulations 5, and these previously-submitted data item-regulation pairs may be used based on a new user-submitted data item 7. In the absence of that discovery, then the system 110 does not know a-priori which regulation the system 110 has to follow. In the absence of discovery, one possibility is to ensure the data item meets the most stringent regulatory requirements.

As an exemplary introduction, application requirements component 40 collects an unstructured description (in user application 14-1) of the application from the user, together with information 14-2 about how the application should perform. The application requirements component 40 encodes everything in a procedural format, passes the application description 41 to the regulation constraints generation component 25 (which also receives the regulations from the regulation discovery component 20, hence can produce the set of constraints resulting from the regulation applied to the application) and passes how the application should perform, as an application objective 42, to the orchestrator component 30, which then produces a strategy 43, based on the objective 42, and the constraints 26.

A procedural description of a required application level of service may be created by the application requirements component 40 from the user application 14-1. That is, in an exemplary embodiment, the application requirements component 40 integrates a procedural description of the required application level of service and produces an application objective 42. One example is the application objective 42 including an application objective of a response by the application within 50 ms. For example, the user might specify (via the application performance information 14-2) that a recommendation system application has to respond within 50 ms, and the application requirements component 40 encodes this in a structured format as previously described. For a GPDR example, one consideration is whether a given process (as user application 14) or API (application programmer interface) (as user application 14) can access the data, since GDPR stipulates that consent should be explicitly provided for specific applications.

The application objective 42 is directed to orchestrator component 30, which effectively solves an optimization problem, where the regulatory constraints 26 come from the regulation constraint generation component 25, and a metric of interest—how well the application works under a certain orchestration—comes from the application objective 42. For instance, one metric of interest is whether the application 14-1 is able to respond within 50 ms.

The regulation constraint generation component 25, given the application requirements and known regulations 21, this component produces entries that are important in the application objective 42, in that modifying the strategy would lead to a violation of their associated regulation(s). The application requirements component 40 produces requirements 41, which is directed to the regulation constraint generation component 25. The requirements 41 includes for instance the fact that the data item needs to be available within some latency, needs to be redundantly stored in case of failure, and the like. Regulation constraint generation component 25 takes these requirements and the regulations associated with the data item to generate a constraint 26 on which data, location mappings are feasible.

Regarding the orchestrator component 30, given the regulatory constraints 26 and the application requirements (from the application objective 42), this component 30 proposes and implements a virtualization strategy 43 that satisfies all regulatory items and allows the user to verify such feasibility. One example of the virtualization strategy 43 is illustrated as virtualization strategy 43-1, which includes a strategy such as "store Data X on Storage Y", where data is associated with storage meeting regulatory requirements.

Another example, which is useful for instance for GDPR, is the virtualization strategy 43-2 of associating input data items to a process consuming the data items based on regulations associated with the input data items. That is, input data items may be associated with (and therefore used by) certain processes, and if so, the use by these processes will be compliant with regulations that are associated with the data items.

In fact, the virtualization strategy 43-2 may be considered to encompass the virtualization strategy 43-1, as the virtualization strategy 43 may always be expressed as an association between a data item and a process (an instance could be a micro-service in a cloud environment). In such architectures, even the storage may be a service, i.e., if one wants to read or write a data item, one calls a service with certain credentials, and that service executes the action. Thus, the virtualization strategy 43-1 may also be expressed as, e.g., "Store Data X on Process X, which uses Storage Y".

In more general terms, any application 14-1 may be broken into elementary processes—including read/write—and the orchestrator component 30 may determine which processes can use which data items, and what the corresponding regulations are. This has relevance in, e.g., the context of cloud environments—and hybrid-cloud in particular—than if the data is entirely on-premise. One point is that the somewhat contrived examples of applications described here, which are seemingly unable to do anything because of fear violating compliance, are much more prevalent in the case of hybrid cloud. In a hybrid cloud scenario, data from a user is on-premise, and the user uses cloud services to process some of the data. This is also applicable to multi-cloud, where data from a user is on some cloud, and services from other cloud providers process the data as well.

At some point, the orchestration strategy 43 will be implemented, e.g., by an orchestration implementation process 44. There are multiple possible techniques for orchestration implementation. One possibility is to have loose coupling between the implementation process 44 (e.g., and the other components 15) and the actual application 14-1 to be executed, which is why application requirements component 40 generates the requirements and constraints of the application 14-1 and nothing else about the application is actually used. For cloud services, it might be more natural to have it that way, with an orchestration strategy 43 being produced again in some abstract consumable format to guide the orchestration (by the orchestration implementation process 44), rather than having an exemplary embodiment subsume the entire application 14-1. That is, a process, such as a cloud process or server process operating on a similar computer system 110, could perform implementation via the orchestration implementation process 44.

As another example, for standard applications which essentially most of the time have similar requirements and constraints, like virtual storage, eventually some templates would be provided by an exemplary embodiment implementing the exemplary components 15 (for instance simply based on the orchestration strategy from some case of virtual storage and additional required details to actually have the application implement the strategy and run the application for that specific instance), which would allow direct implementation of a natively compliant application for other instances of such standard applications. That is, an application 14-1 (e.g., a revised version of the same, e.g., using a template as provided by or based on the orchestration strategy 43) could implement the orchestration implementation process 44. Additionally, the orchestration implementation process 44 may be implemented by the computer system 110, which means the application 14-1 is subsumed by the computer system 110. For generic complex applications, however, it might not be realistic to have an exemplary embodiment using the computer system 110 subsume the entire application.

Turning to FIG. 1B, this figure shows a block diagram of one possible and non-limiting exemplary system 100 in which the exemplary embodiments may be practiced. In FIG. 1A, a server computer system 110 is in (or may be in) wired and/or wireless communication with a wired and/or wireless network(s) 197 and through the network(s) 197 to other computer system(s) 190. The computer system 110 could be accessible over one or more wired or wireless networks 197, could be implemented in the cloud 195, and the like. The computer system 110 could be a server, although a client-server relationship is not required.

The computer system 110 includes one or more processors 120, one or more memories 125, one or more transceivers 130, one or more network (N/W) interfaces (I/F(s)) 145, and user interface circuitry 165, interconnected through one or more buses 127. Each of the one or more transceivers 130 includes a receiver, Rx, 132 and a transmitter, Tx, 133. The one or more buses 127 may be address, data, and/or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123.

The computer system 110 includes a regulatory compliance module 140, comprising one of or both parts 140-1 and/or 140-2. The regulatory compliance module 140 performs the operations described herein, such as to implement the core components 15 of FIG. 1A, or any other operations presented herein. The regulatory compliance module 140 may be implemented in a number of ways. The regulatory compliance module 140 may be implemented in hardware as regulatory compliance module 140-1, such as being implemented as part of the one or more processors 120. The regulatory compliance module 140-1 may be implemented also as an integrated circuit or through other hardware such as a programmable gate array. In another example, the regulatory compliance module 140 may be implemented as regulatory compliance module 140-2, which is implemented as computer program code 123 and is executed by the one or more processors 120. For instance, the one or more memories 125 and the computer program code 123 may be configured to, with the one or more processors 120, in response to retrieval and execution of the computer program code 123, cause the computer system 110 to perform one or more of the operations as described herein. It should also be noted that the devices shown in the computer system 110 are not limiting and additional, different, or fewer devices may be used.

The user interface circuitry 165 communicates with one or more user interface elements 105, which may be formed integral with the computer system 110 or be outside the computer system 110 but coupled to the computer system 110. The interface elements 105 include one or more of the following: one or more camera(s); one or more audio device(s) (such as microphone(s), speaker(s), and the like); one or more sensor(s) (such as GPS sensor(s), fingerprint sensor(s), orientation sensor(s), and the like); one or more displays; and/or one or more keyboards. A display 111 is shown, which could be external or internal to the computer system 110. This list is not exhaustive or limiting, and other, different, or fewer elements may be used. A user 101-1 (a human being in this example) may interact with the computer system 110, e.g., to cause the system 110 to take certain actions. These operations may also be caused by the computer system 110, in combination with actions by the user 101 or without actions by the user 101. The computer system 110 communicates with the other computer system(s) 190 via the one or more wired or wireless networks 197, via one or both of wired link 177 and wireless link 178. Additionally, if the computer system 110 is implemented in the cloud 195, a user 101-2 may interact with the computer system 110 via the wired and/or wireless network(s) 197 and using a computer system 190. In this example, the computer system 190 would have the appropriate user I/F circuitry and user I/F elements (not shown).

Exemplary embodiments therefore comprise systems and methods for regulatory compliance as a service implemented, e.g., on a cloud or on a hybrid cloud, though other implementations (such as a typical server) are possible. The term hybrid cloud denotes an environment including a combination of on-premise, private cloud and public cloud, and characterizes one of the most general environments currently used. Exemplary cloud environments are described in reference to FIGS. 3 and 4, described below.

Figure 2A:
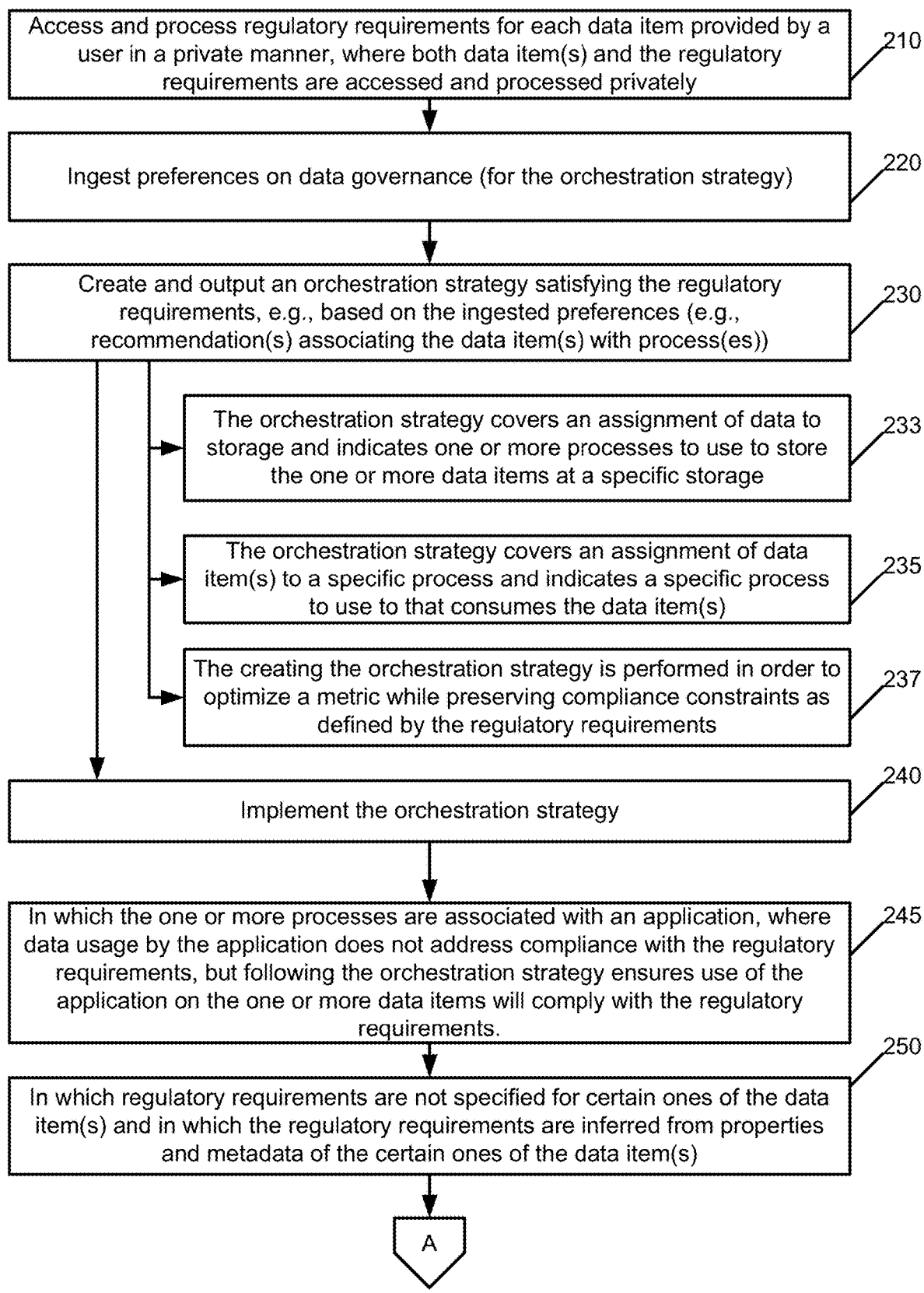
FIGS. 2A and 2B, is a flowchart of a method for regulatory compliance for applications for an exemplary embodiment.
Figure 2B:
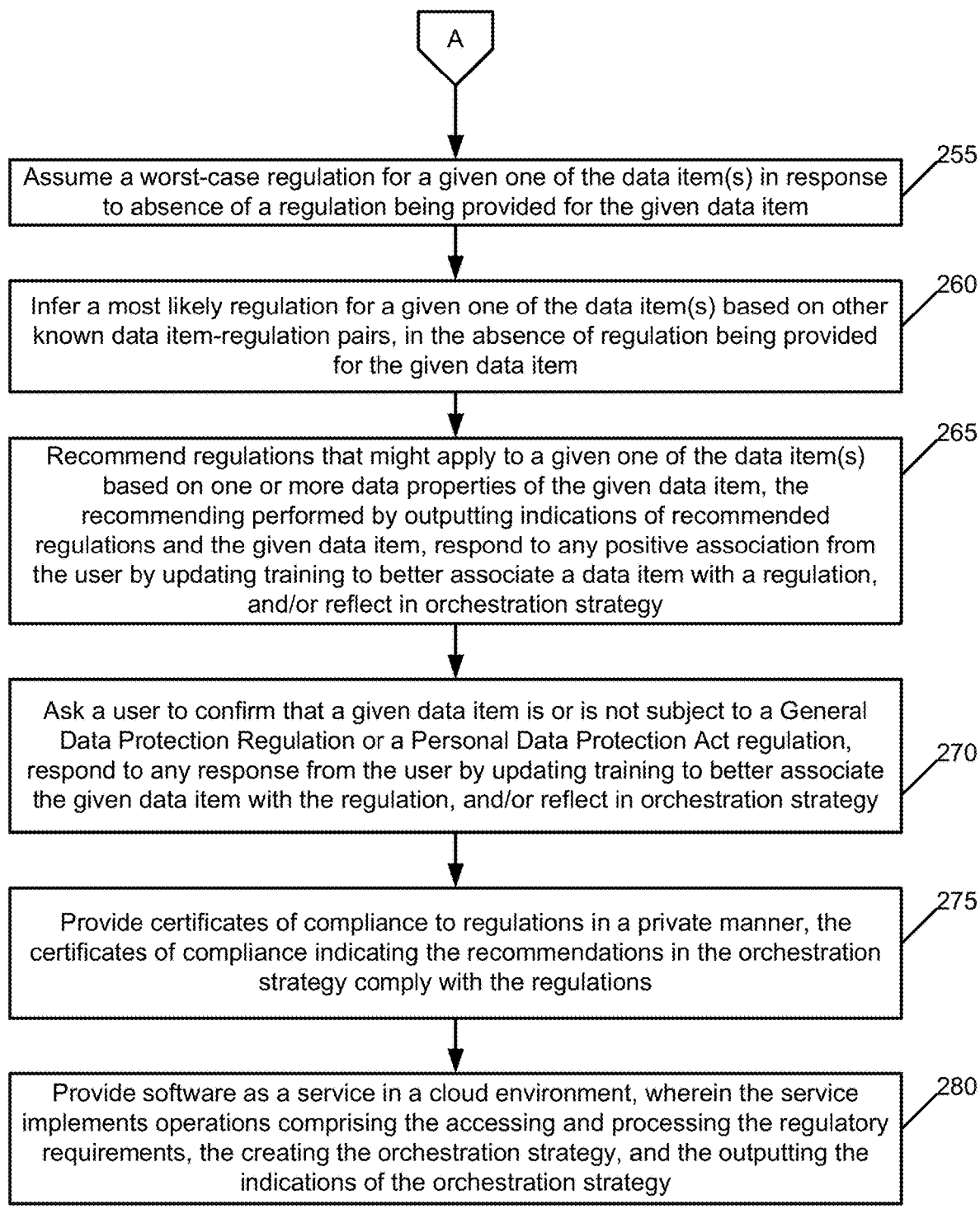

The exemplary embodiments may include the following operations, as illustrated by FIG. 2. FIG. 2, spread over FIGS. 2A and 2B, is a flowchart of a method for regulatory compliance for applications for an exemplary embodiment. The operations in this figure are assumed to be performed by the computer system 110, e.g., under control of the regulatory compliance module 140. FIG. 2 also illustrates the operation of an exemplary method or methods, a result of execution of computer program instructions embodied on a computer readable memory, functions performed by logic implemented in hardware, and/or interconnected means for performing functions in accordance with exemplary embodiments. The regulatory compliance module 140 may be implemented on a cloud as a service, as described below in reference to FIGS. 3 and 4.

In block 210, the computer system 110 ingests (e.g., accesses and processes) regulatory requirements for each data item provided by a user in a private manner. The private manner may be defined as follows. Typically a process is called private if no other information than the intended output/usage is revealed by the actual execution about the input data. For instance, if a process is meant to calculate the average of input values, it is called private if, whichever way the intermediary output is analyzed from the process, no other information is learned about the input data than the average of the input values that are actually intended to be computed. This applies at all levels, e.g. if a company provides a recommendation system, the system is private if and only if while using the system no one learns anything else about the input data than the recommendations produced by the system. The accessing may be to data items stored previously in a memory or to received data items, e.g., received from a user 101 over a network.

The computer system 110 in block 220 may ingest preferences based on a data governance strategy. The preferences may be the exogenous preferences 12 in FIG. 1A and place requirement(s) on an orchestration strategy 43. The preferences may also not be implemented.

In block 230, the computer system 110 creates and outputs an orchestration strategy satisfying the regulatory requirements. The system outputs a feasible solution but can also output variants, which may (or may not) align better with some unstated preferences from the user. In block 230, the creating the orchestration strategy may also use the ingested preferences to create the orchestration strategy, if the ingested preferences are used. For instance, the requirements based on centralization, encryption, or distribution for the exogenous preferences 12 in FIG. 1A will be used for the orchestration strategy 43. Other examples are possible, too.

As an example of a feasible solution, the output orchestration strategy 43 might cover an assignment of data to storage and indicate one or more processes to use to store the data item(s) at a specific storage. See block 233. The specific storage is at a physical location in the world, and the specific storage may be general (e.g., storage in a facility located in a specific country or much more specific such as in a specific part of that facility, or the like). The process for the specific storage is assumed to be linked to that storage and, e.g., cannot use another storage. It is noted that it is also possible that the data is free to be stored anywhere, and in this case, any storage and corresponding process might be indicated.

Another example is illustrated by block 235, where the orchestration strategy 43 covers an assignment of data items to a specific process and indicates a specific process to use to that consumes the data item(s). The specific process is part or all of the application 14-1.

Block 237 indicates another example, where the creating the orchestration strategy is performed in order to optimize a metric while preserving compliance constraints as defined by the regulatory requirements. The metric described above, where the application has to respond within 50 ms, is an example. It is noted that it may not be necessary to optimize the metric. For example, there may be two solutions under 50 ms, such as 40 ms and 15 ms. Either one of these might be chosen, though the 15 ms solution might technically be optimal, depending on the optimization technique used.

In more detail for block 237, the orchestration strategy is evaluated using a set of business metrics, and can be optimized according to these metrics. In practice, one wants to avoid the trivial case, where in order not to violate compliance, an implementation decides not to run the application.

Other possible metrics include availability of the application, i.e. how often the application is operating, which minimally requires some redundancy in the pipeline. Another consideration could be a number of concurrent requests that can be executed, which requires being able to distribute jobs. The corresponding load balancing problem is typically performed by solving a resource allocation problem, although lately learning methods such as reinforcement learning have also been used.

Another example is latency minimization, where considering network latency to dominate a scenario, is solved via a variant of the facility location problem (i.e., where to put a company's data centers given where the company's users are), and then a maximum flow problem, involving how to route the company's packets. The redundancy could be solved using a minimax approach, i.e. how to maximize the serving performance in the worst-case, where a certain number of nodes are down.

In block 240, the orchestration strategy 43 is implemented. That is, the allowed processes consume the data items. This operation may be performed by the orchestration implementation process 44, using techniques as previously described. It is noted for these problems, the orchestration strategy 43 could be output in a format consumable by the orchestration implementation process 44 and the user 101. Further, depending on the criticality, the computer system 110 may require a user 101 to acknowledge and approve the strategy for deployment.

Blocks 245-280 indicate different additional examples, which may be added as alternates or additionally. In block 245, the method above is assumed, in which the one or more processes are associated with an application, where data usage by the application does not address compliance with the regulatory requirements, but following the orchestration strategy ensures use of the application on the one or more data items will comply with the regulatory requirements. That is, as described in detail above, the application does not address (e.g., is not designed for) compliance with the regulatory requirements for the data items being handled by the application. The exemplary embodiments address this by providing a computer system 110, e.g., implemented on a cloud, that address the compliance with the regulatory requirements for the data items being handled by the application.

One additional example includes the operations above, in which regulatory requirements are not specified for certain data items and must instead be inferred from properties and metadata of data records corresponding to the data items. One example of this is illustrated by block 250, in which regulatory requirements are not specified for certain ones of the data item(s). In this case, the computer system infers the regulatory requirements from properties and metadata of the certain ones of the data item(s). For example, if the data schema has column names like NAME, SURNAME, DATE_OF_BIRTH, and the like, the computer system 110 could infer that the data must follow privacy regulations.

Block 255 illustrates another example, where the computer system 110 assumes a worst-case regulation for a given one of the data item(s) in response to absence of a regulation being provided for the given data item. For example, if no regulation is provided for a data item, and the worst-case regulation is that the data may only be stored in the US and encrypted, this would be implemented.

Another example is the computer system 110 infers a most likely regulation for a given one of the data item(s) based on other known data item-regulation pairs, in the absence of regulation being provided for the given data item. See block 260. That is, if certain regulations were previously deemed applicable to similar data items (say, health records), it could be inferred that the current data items (e.g., also health records) are also applicable to those certain regulations.

Another possibility is the computer system 110 recommends regulations that might apply to a given one of the data item(s) based on one or more data properties of the given data item. The recommending is performed by outputting indications of recommended regulations and the given data item. See block 265. The outputting could be to the display 111, or could be information suitable for presentation to a user 101-2 using another computer system 190, as examples. This may be considered the same as in block 260, except with human in the loop. In practice, this could be an important component since when one drops a file on Box (as one example of a storage virtualization service), one typically has no idea of the regulations to which the file is subject. So the computer system 110 would perform some informed guessing based on, e.g., metadata and learning of data, and e.g., regulation pairs from other data items for which the regulation was known, propose a set of regulations to the user, the user would check which ones he or she wants to follow, maybe the user is asked also to say whether he or is sure or not, and the system uses the instances of being sure to further train the component to better associate a data item with a regulation. This is captured by the computer system 110 responding to any positive association from the user by updating training to better associate a data item with a regulation. Additionally or alternatively, this would also be reflected in the orchestration strategy 43.

In block 270, the computer system 110 asks a user to confirm that the data record is or is not subject to a General Data Protection Regulation or a Personal Data Protection Act regulation. The asking could be performed by outputting to the display 111, or outputting information suitable for presentation to a user 101-2 using another computer system 190, among other examples. The user would confirm (is subject) or reject (is not subject) these. A user 101 is involved for two reasons: i) to learn from the user when the user is confident; and/or ii) to get approval and make the user accountable in particular for more sensitive cases. Any response from the user is captured by updating training to better associate (if confirmed) a data item with a regulation or not to associate (if rejected) a data item with the regulation. Additionally or alternatively, this would also be reflected in the orchestration strategy 43.

In block 275, the computer system 110 provides certificates of compliance 45 to regulations in a private manner, the certificates of compliance indicating the recommendations in the orchestration strategy comply with the regulations. As previously described and briefly captured here, a process is called private if no other information than the intended output/usage is revealed by the actual execution about the input data.

In block 280, the computer system 110 provides software as a service in a cloud environment. The service implements operations comprising the accessing and processing the regulatory requirements, the creating the orchestration strategy, and the outputting the indications of the orchestration strategy. More detailed information for cloud implementations is provided below in reference to FIGS. 3 and 4.

One exemplary advantage is that compliance verification may be performed in a private manner, hence can be virtualized and automated, and integrated in, e.g., cloud services in order to provide cloud-native compliance.

The exemplary embodiments described above have been indicated as potentially being implemented in the cloud. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
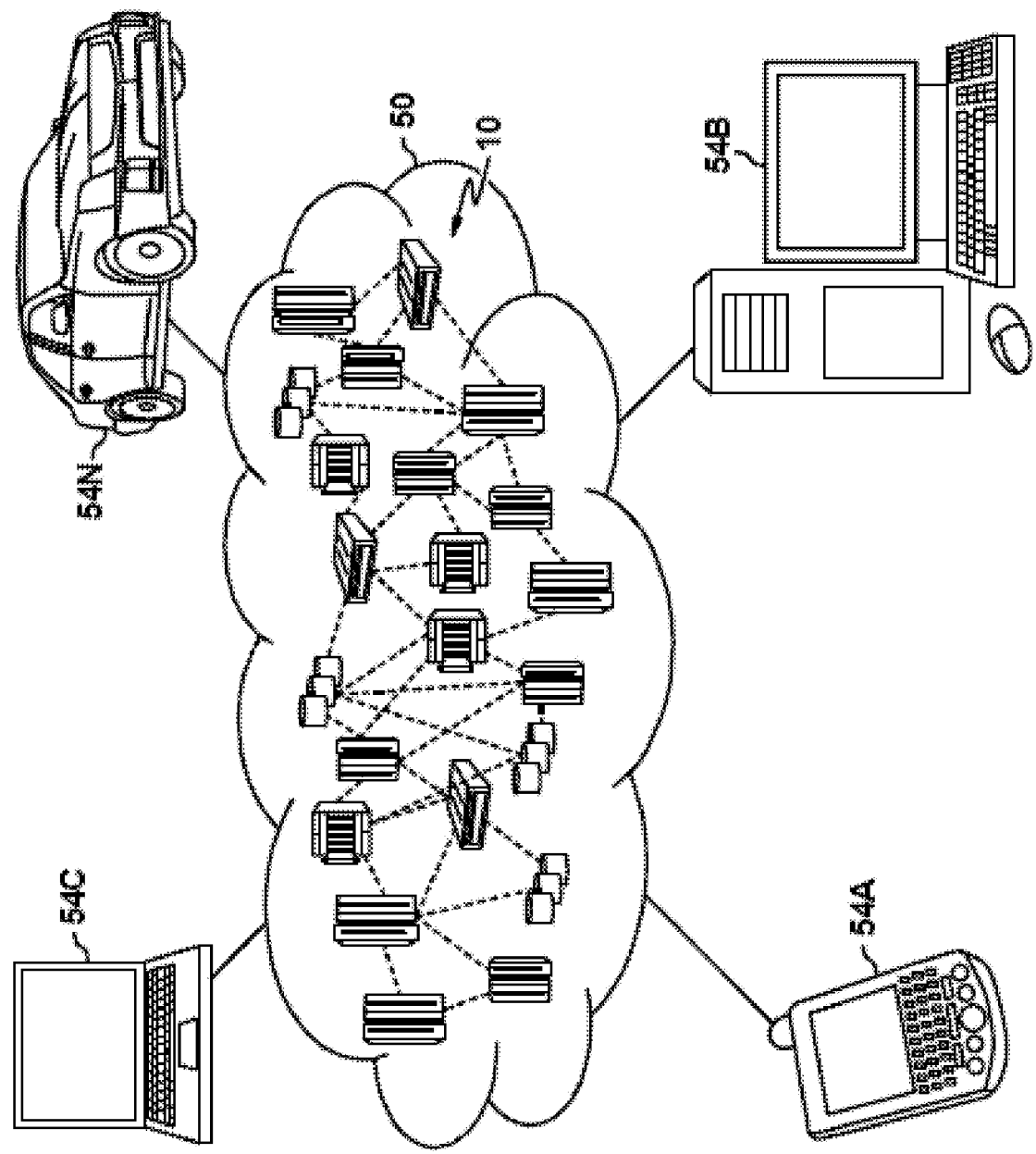
FIG. 3 depicts a cloud computing environment according to an exemplary embodiment.

Referring now to FIG. 3, illustrative cloud computing environment 50 is depicted. Some or all of the cloud computing environment 50 that implements any of the examples herein may be considered to be a computer system 110. Put differently, a computer system 110 may be considered to be a portion of the cloud computing environment 50 that implements any of the examples herein. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 3 are intended to be illustrative only and that computing nodes 10 and cloud computing environment 50 can communicate with any type of computerized device over any type of network and/or network addressable connection (e.g., using a web browser).

Figure 4:
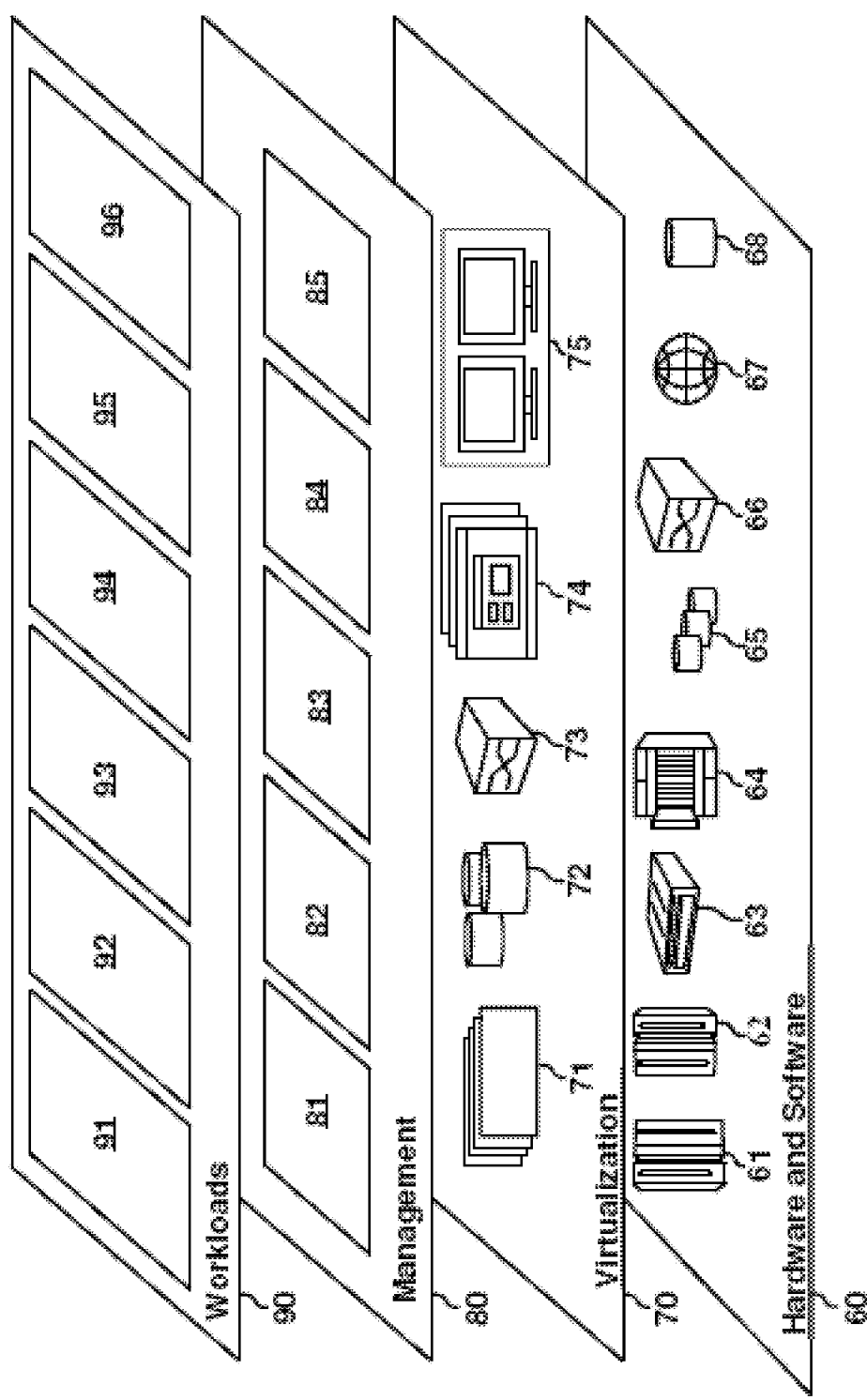
FIG. 4 depicts abstraction model layers according to an exemplary embodiment.

Referring now to FIG. 4, a set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a regulatory compliance service 96. The regulatory compliance service 96 is a service that implements the examples provided herein, such as implementing the regulatory compliance module 140 and the operations of FIG. 2.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
    accessing and processing, by a computer system, regulatory requirements for one or more data items in a private manner, wherein both the one or more data items and the regulatory requirements are accessed without reading the one or more data items or regulatory requirement in plaintext and processed privately with no information being revealed about input data from the one or more data items other than intended output;
    creating by the computer system an orchestration strategy satisfying the regulatory requirements, wherein the orchestration strategy comprises one or more recommendations assigning the one or more data items to one or more processes that will consume the one or more data items as part of implementation of the orchestration strategy; and
    outputting by the computer system indications of the orchestration strategy to be used to implement regulatory compliance.

2. The method of claim 1, wherein the orchestration strategy covers an assignment of data to storage and indicates specific ones of the one or more processes to use to store the one or more data items at a specific storage.

3. The method of claim 1, wherein the orchestration strategy covers an assignment of certain data items of the one or more data items to a specific process of the one or more processes and indicates the specific process to use that consumes the specific data items.

4. The method of claim 1, further comprising ingesting, by the computer system, preferences from a user on the orchestration strategy, and wherein the creating the orchestration strategy uses the ingested preferences to create the orchestration strategy.

5. The method of claim 1, further comprising providing certificates of compliance to regulations in a private manner, the certificates of compliance indicating the recommendations in the orchestration strategy comply with the regulations.

6. The method of claim 1, in which the regulatory requirements are not specified for certain data items of the one or more data items and the method comprises inferring by the computer system the regulatory requirements from properties and metadata of the certain data items.

7. The method of claim 1, further comprising assuming by the computer system a worst-case regulation for a certain data item of the one or more data items in response to absence of a regulation being provided in the regulatory requirements for the certain data item.

8. The method of claim 1, further comprising inferring by the computer system a most likely regulation for a certain data item of the one the one or more data items based on other known data records-regulation pairs, in the absence of regulation being provided for the certain data item.

9. The method of claim 1, further comprising:
    recommending by the computer system regulations that might apply to a given one of the one or more data items based on one or more data properties of the given data item, the recommending performed by outputting indications of recommended regulations and the given data item for display to a user;

responding by the computer system to any positive association from the user and between recommended regulations and the given data item by updating training to associate the given data item with a recommended regulation indicated by a positive association.

10. The method of claim 1, further comprising asking, by the computer system, a user to confirm that a given data item of the one or more data items is or is not subject to a General Data Protection Regulation or a Personal Data Protection Act regulation, and responding by the computer system to any response from the user and between recommended regulations and the given data item by updating training to associate the given data item with a recommended regulation in response to the user confirming one of the regulations applies or updating training not to associate the given data item with a recommended regulation in response to the user rejecting that one of the regulations applies.

11. The method of claim 1, wherein creating the orchestration strategy is performed in order to optimize a provided metric while preserving compliance constraints as defined by the regulatory requirements.

12. The method of claim 1, further comprising providing by the computer system software as a service in a cloud environment, wherein the service implements operations comprising the accessing and processing the regulatory requirements, the creating the orchestration strategy, and the outputting the indications of the orchestration strategy.

13. The method of claim 1, wherein the one or more processes are associated with an application, where data usage of the one or more data items by the application does not address compliance with the regulatory requirements, but following the orchestration strategy ensures use of the application on the one or more data items will comply with the regulatory requirements.

14. A computer system, comprising:
one or more memories having computer-readable code thereon; and
one or more processors, the one or more processors, in response to retrieval and execution of the computer-readable code, causing the computer system to perform operations comprising:
accessing and processing regulatory requirements for one or more data items in a private manner, wherein both the one or more data items and the regulatory requirements are accessed without reading the one or more data items or regulatory requirement in plaintext and processed privately with no information being revealed about input data from the one or more data items other than intended output;
creating an orchestration strategy satisfying the regulatory requirements, wherein the orchestration strategy comprises one or more recommendations assigning the one or more data items to one or more processes that will consume the one or more data items as part of implementation of the orchestration strategy; and
outputting indications of the orchestration strategy to be used to implement regulatory compliance.

15. The computer system of claim 14, wherein the one or more processors, in response to retrieval and execution of the computer-readable code, cause the computer system to perform operations comprising assuming by the computer system a worst-case regulation for a certain data item of the one or more data items in response to absence of a regulation being provided in the regulatory requirements for the certain data item.

16. The computer system of claim 14, wherein the one or more processors, in response to retrieval and execution of the computer-readable code, cause the computer system to perform operations comprising inferring by the computer system a most likely regulation for a certain data item of the one the one or more data items based on other known data records-regulation pairs, in the absence of regulation being provided for the certain data item.

17. The computer system of claim 14, wherein the one or more processors, in response to retrieval and execution of the computer-readable code, cause the computer system to perform operations comprising:
recommending by the computer system regulations that might apply to a given one of the one or more data items based on one or more data properties of the given data item, the recommending performed by outputting indications of recommended regulations and the given data item for display to a user;
responding by the computer system to any positive association from the user and between recommended regulations and the given data item by updating training to associate the given data item with a recommended regulation indicated by a positive association.

18. The computer system of claim 14, wherein creating the orchestration strategy is performed in order to optimize a provided metric while preserving compliance constraints as defined by the regulatory requirements.

19. The computer system of claim 14, wherein the one or more processors, in response to retrieval and execution of the computer-readable code, cause the computer system to perform operations comprising providing by the computer system software as a service in a cloud environment, wherein the service implements operations comprising the accessing and processing the regulatory requirements, the creating the orchestration strategy, and the outputting the indications of the orchestration strategy.

20. The computer system of claim 14, wherein the one or more processes are associated with an application, where data usage of the one or more data items by the application does not address compliance with the regulatory requirements, but following the orchestration strategy ensures use of the application on the one or more data items will comply with the regulatory requirements.

* * * * *